United States Patent
Ferger et al.

(10) Patent No.: US 11,799,654 B2
(45) Date of Patent: *Oct. 24, 2023

(54) SECURE COMMUNICATION TOOL FOR USE ALONGSIDE NON-SECURE COMMUNICATIONS

(71) Applicant: Rhinogram, LLC, Chattanooga, TN (US)

(72) Inventors: Bo Ferger, Lakesite, TN (US); Rob Whelan, Daniel Island, SC (US)

(73) Assignee: Rhinogram Inc., Chattanooga, TN (US)

( * ) Notice: Subject to any disclaimer, the term of this patent is extended or adjusted under 35 U.S.C. 154(b) by 374 days.

This patent is subject to a terminal disclaimer.

(21) Appl. No.: 17/230,324

(22) Filed: Apr. 14, 2021

(65) Prior Publication Data
US 2021/0234692 A1    Jul. 29, 2021

Related U.S. Application Data

(63) Continuation of application No. 15/813,303, filed on Nov. 15, 2017, now Pat. No. 11,012,236.

(51) Int. Cl.
*H04L 9/32* (2006.01)
*H04L 9/40* (2022.01)

(52) U.S. Cl.
CPC ............ *H04L 9/321* (2013.01); *H04L 9/3226* (2013.01); *H04L 9/3234* (2013.01); *H04L 63/061* (2013.01); *H04L 63/123* (2013.01)

(58) Field of Classification Search
CPC ........................................................ H04L 9/321
See application file for complete search history.

(56) References Cited

U.S. PATENT DOCUMENTS

| | | | |
|---|---|---|---|
| 2004/0210772 A1 | 10/2004 | Hooker | |
| 2006/0080336 A1* | 4/2006 | Zhang | G06F 8/36 |
| 2015/0020210 A1 | 1/2015 | Brown | |
| 2017/0329922 A1* | 11/2017 | Eberting | G16H 40/67 |

OTHER PUBLICATIONS https://cloakmy.org/, retrieved from way back machine Mar. 22, 2016 (Year: 2016).
https://iphone8yserguide.com/wp-content/uploads/manual/iphone-8-user-guide-ios-11.pdf, Sep. 19, 2017 (Year: 2017).

* cited by examiner

*Primary Examiner* — Simon P Kanaan
(74) *Attorney, Agent, or Firm* — Miller & Martin PLLC

(57) ABSTRACT

A method of communicating through a less secure messaging system provides an option of masking messages sent from a second party to a first party so that they are unreadable when received by the first party. For some embodiments, it may be that they are visible, but unreadable, other embodiments, not visible. In either case, an authorization may be provided by the first party to make the masked messages readable messages, for many embodiments until a session rule makes the readable message a masked message again.

20 Claims, 3 Drawing Sheets

SECURE COMMUNICATION TOOL FOR USE ALONGSIDE NON-SECURE COMMUNICATIONS

FIELD OF THE INVENTION

The present invention relates to a secure communication tool, possibly for use within a less secure environment, such as within unsecure messaging systems such as Apple Messages, Facebook Messenger or other traditionally unsecure messaging platforms having non-secure communications.

BACKGROUND OF THE INVENTION

The Apple Corporation recently released a product called Business Chat which allows businesses to chat with consumers through Messages. A different text bubble pallet, such as black and gray and instead of blue, is provided with that product which can indicate the consumer is messaging with a business rather than with an individual. The product hopes to expose advantages of a richer chat experience to businesses without forcing a user to install a different messaging application. The level of security provided by this new product is not known to the applicant.

Traditionally, if an individual has a Smartphone operating on the iOS platform and leaves that phone unlocked, anyone can pick up that phone and open Messages to then read any of the messages contained therein. Some of those messages may contain personal information such as Protect Health Information (PHI), which is protected under HIPAA, the Health Insurance Portability and Accountability Act, or other private data desired particularly by businesses and others not to become public. Short Message Service (SMS), also known as text messages, are typically unencrypted at some point during the delivery process, thus rendering an SMS channel insecure.

There are no access controls once Messages or Messenger is opened. Accordingly, there is a need in the marketplace for making traditionally less secure communication systems more secure, particularly both Facebook and Apple are each believed to have over two billion users.

SUMMARY OF THE INVENTION

It is a present object of many embodiments of the present invention to provide an improved communications tool for use with less secure messaging systems to make at least some messages or communications more secure.

It is another object of many embodiments of the present invention to provide an improved messaging tool for use with at least one of Messages and Facebook Messenger.

It is a present object of many embodiments of the present invention to provide an improved messaging tool.

Within traditionally unsecure environments such as Apple Messages, the applicant has discovered a way to provide for more secure communication preferably achieving at least one if not two if not three of the objectives: (a) providing encryption of data from one user to another, (b) encryption of the data at rest for at least one party, if not both, and/or (c) access controls as well, preferably while still permitting unsecure communications at the option of the user through the same communication tool.

Accordingly, in accordance with many embodiments of the present invention, a tool is provided for use such as with the Apple Messages application whereby the tool cooperates with that with system to provide a method of sending and/or receiving encrypted messages from one device to another for encryption. Continued possible encryption on at least one if not both ends can be provided so that stored information at rest is encrypted. Additionally, access controls and/or session rules are preferably provided within the messaging system itself so as to be able to positively identify a particular user and/or to permit access to at least certain messages.

Furthermore, some embodiments may provide a mechanism using traditional communication technology such as Apple Messages and/or Facebook Messenger to provide a secure messaging option so as to facilitate communications such as HIPAA regulated information for the medical industry, sufficient security to enable the financial industries to communicate with their customers as well, and/or other purpose, preferably while simultaneously permitting unsecured communication within the same channel. There may be additional markets which can benefit from this technology as well.

Messaging applications and tools have been around for many years. In more recent years Apple has allowed developers to insert apps within the Messages platform such as Open Table (which permits users to make restaurant reservations through the Messages platform) and can allow for the transmission of video, audio, images and/or other data. While many improvements are available through the app store for the Messages experience, the applicant is unaware of any capability of being able to provide security for at least some transmitted message through the Messages platform. Accordingly, at least one embodiment of the applicant's tool provides for encrypted messaging within this environment.

Such a capability provides not only for an ability for the users to maintain information confidential but can also comply with HIPAA and/or various financials security regulations for privacy and/or other privacy concerns that users and/or businesses might have.

Data received by the end user could be encrypted at rest in a cloud database server.

Some embodiments of the applicant's method and application envision data being sent from a user to the applicant where it is stored on the applicant's server in an encrypted form while also being sent to an intended recipient which could also have the app used thereon (and the message possibly be stored in an encrypted manner as well until access controls are sufficiently provided). At the applicant's server as well as on both of the sending (second party) and receiving (first party) devices, the data could be stored in a secured format so that it could be safe at rest.

Additionally, session rules could be provided in many different ways, possibly to specific messages. Specifically, when using the messaging service with a "secure" message which might otherwise appear, if the messaging service has not been used for a period of time such as ten minutes, then the secure message may be masked such as by having an overlay provided thereon where the message becomes unreadable and/or made at least partially unreadable to the point of not being able to discern the information contained therein until the user re-enters the authorization control such as a PIN, password and/or other authorization. The "secure message" could also be removed (so that it does not appear at all and there might not even been any indication that it does exist) until authorization is provided.

Other session rules could include logging out, placing the messaging tool in a background mode, allowing a period of time to elapse after entering the program, turning the screen off or some other action or inaction.

Not only can encryption be provided, but data may be protected specifically by the session rules to permit the timing out and/or other session rules being applied. At rest the data (for at least selected messages, while possibly still permitting access to less secure communications) could be stored in an encrypted form. The applicant believes this technology could be applied not only to Apple Messages but also to Facebook Messenger and possibly other messaging applications which are less secure than desired by the applicant for at least some messages.

What is particularly attractive about this technology is that a less secure messaging service can be utilized to provide a more secure environment for at least some messages possibly while still permitting communications of a non-sensitive nature in the traditional manner. Specifically, the less secure environments account for over two billion users across the world. These users are unlikely to change their messaging service to a different messaging service but could greatly benefit from an ability to utilize secure communications within the communication programs they currently utilize. Additionally, unsecured messages could still be sent and received utilizing the exact same system for at least some embodiments.

Many texts could contain some data which might be PHI such as a first name or last name, social security number and/or any of eighteen possible identifiers currently recognized as PHI. Others may be utilized.

Accordingly, once someone opens up their Messages or less secure communications portal, in order to read secure messages, at that time they may be able to provide a login or other authorization to read all or at least a plurality of secure messages. A separate authorization would not likely be needed to read unsecure messages. If they were to send a secure message, they may only need to touch an icon which may provide for security of that message not only when it is sent but also as it is stored on the device. As it relates to the Messages system, it may recognize that something is being sent but doesn't necessarily know what it is. It might be treated no different from the Messages program as SMS data and/or some type of audio or image or video file (except that it is encrypted).

After a period of time (or other session rules are applied) secure message(s) can then be masked such as by making it temporarily disappear, blurring the text, imposing a logo or other layer over it, imposing confidential over it while making it unreadable or doing something so that the text is not readable possibly while indicating that there is a secure message at that location which might be accessed. In order to access the message, it is likely that the user can click on the message to then possibly then provide a PIN, an authorization code, a passcode, or some other authorization which, once properly entered, can then allow the user to view the content of the secure message(s).

This way the data at rest may be maintained in an encrypted format. Thus, the data, even if someone improperly accessed someone's phone such as by picking it up and viewing it, they would be unable to view any of the secure messages as they would lack the access controls to access the data.

Accordingly, what this tool provides is a messaging tool within a less secure messaging environment to provide at least one of access controls to at least certain messages, encryption of data from one user to another and preferably the ability to maintain encryption of data at rest at least at one of the two of the sending and/or receiver. Text bubble may be color coded to reflect the encrypted nature of the message/communication when viewed.

Possible uses of this technology may include fitness, health, medical, finance and/or other industries.

While the applicant has investigated a need for this tool as it relates to the Apple Messages product and Facebook Messenger, it may be possible that other Android, Google or other messaging systems may also benefit from such technology.

In addition to time related session rules, such as a pure clock which ends the ability to view ten minutes later, an activity clock which starts on the counting down at the end of the last contact, a switch program which could then lock information if the Messages is put in a background mode or a lock screen mode. Other session rules could be applied as well.

The proposed tool provides a way to provide compliance with not only the financial industry and HIPAA but possibly other environments which also could benefit from securely communicating data from one party and another.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENTS

Figure 1:
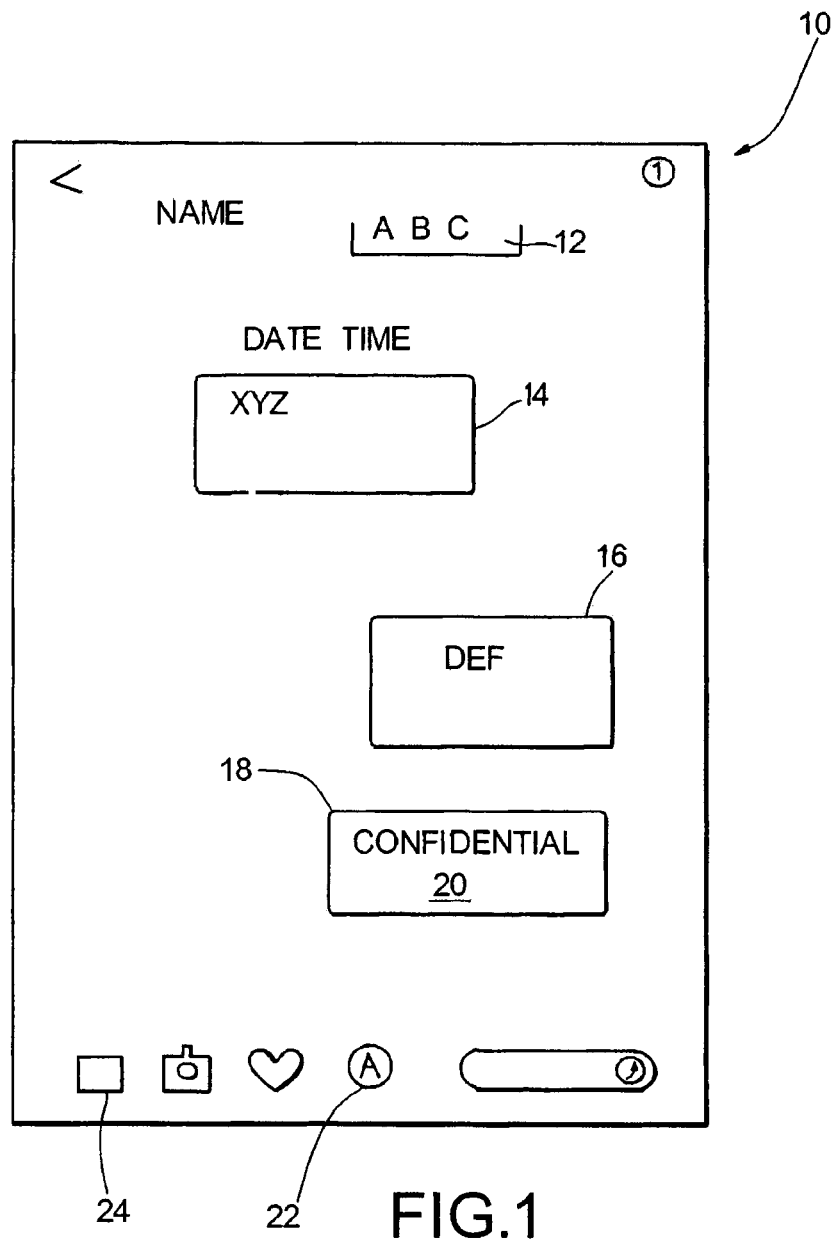
FIG. 1 is a screen shot showing a first embodiment of the present invention.

FIG. 1 shows a screen shot of a Messages account showing conversation between two parties (first and second) with text bubbles portions 12, 14, 16 and 18 on an electronic device of first party such as a smartphone, tablet, etc. Text bubble 18 is shown as being confidential which shows a mask 20 disposed on top of an underlying text bubble 18. Other masks 20 are described above and could take on various forms, or the text bubble 18 might not be visible at all or provided in other forms.

Figure 2:
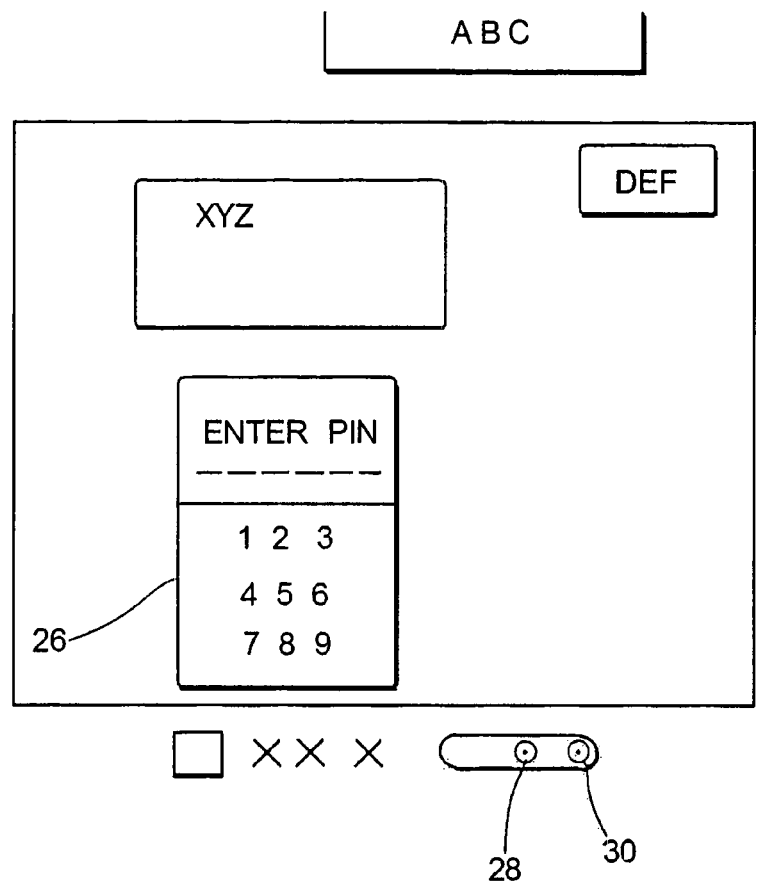
FIG. 2 is a screen shot showing the first embodiment of the present invention.
Figure 3:
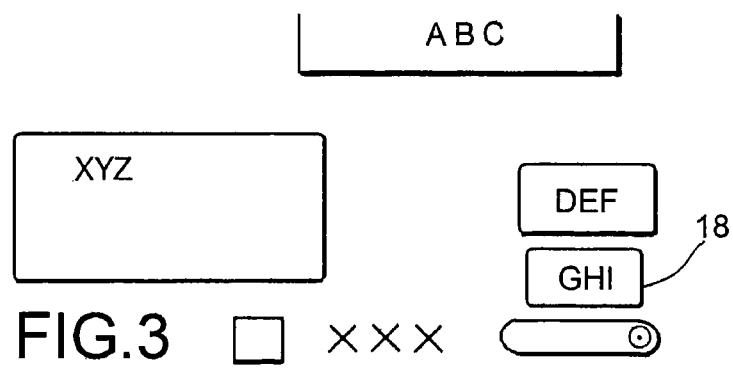
FIG. 3 is a screen shot showing the first embodiment of the present invention.

Of course, the user of this capability is likely to have downloaded an app which can be acquired from the app store or other online store just by clicking on an icon 22 and then downloading from the app store so that the program possibly inserts an icon 24 and/or other icon within the screen 10. By tapping on the mask 20 or other location such as on icon 24 or other location, an access control box 26 may appear as shown in FIG. 2 into which one could enter a PIN and if the correct PIN is then entered then the text bubble 18 could then be viewed. Other authorizations as are known in the art could be provided as well.

It is possible that text bubble 18 could be a different color than non-secure text bubbles 12, 14, 16 to indicate its confidential nature. Once secure text bubble 18 is actually viewable for some embodiments, then the session rules can start then being applied if not already started so that if one of the session rules is met, the text bubble 18 is then covered back over or removed. Other similarly secured communications could also be covered back over with masks 20 and/or removed. Not only can sending text bubbles 18 be covered with mask 20, but also received text bubbles 14 could also be covered over with masks 20 or temporarily. Unsecured texts bubbles such as 12, 16 would likely not be covered over or removed for many embodiments. They could remain viewable like they presently are provided. It may also be possible to subject unsecure text bubbles such as 12, 16 to the security protocol such as by clicking on the icon 24 and performing a certain set of steps and/or performing other steps for at least some embodiments.

In order to send a secure message, it may be possible to add a second send button 30 other than traditional send button 28 so that a sender could select which of secure send button 30 and non-secure send button 28 communication to provide for any particular send.

The establishment of the secure communication is not particularly difficult particularly when the app is downloaded to the smart device by the user. At this point and/or at later points, security keys can be used for each of the users and/or each of the messages as well is well known within encryption technology.

Figure 4:
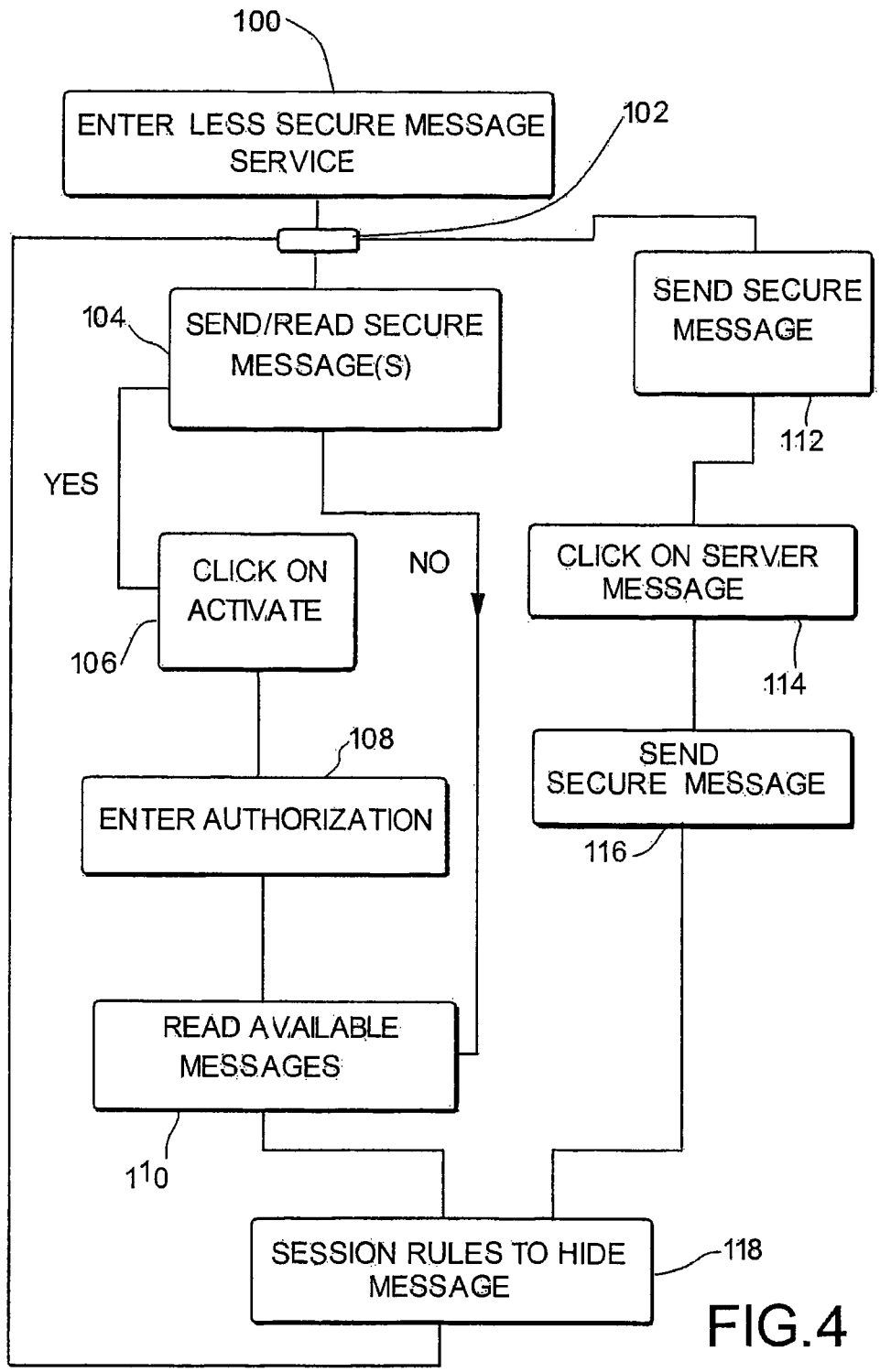
FIG. 4 is a flow chart showing operation of the preferred embodiment of the present invention.

FIG. 4 shown a flow chart showing a process of a presently preferred embodiment. Specifically, a party enters a less secure messaging service at step 100. At step 102 the applicant's tool may be downloaded, if not already done so, and/or implemented.

If a secure message is desired to be read at step 104, then a secure message or other icon or even a particular message can be clicked on. In the illustrated embodiment, message 18, mask 20, and/or icon 24 could be clicked on at step 106 so that authorization could be provided at step 108 such as using screen 26 to then remove the mask 20 and/or make visible the text bubble(s) 18 and possibly others in this conversation or even possibly up to all in the messaging program at step 110. They may appear with a different colored text bubble than unsecure or other text bubbles for some embodiments.

In order to send the secure message at step 112 user can either click on the icon 24 at step 114 and/or select a second send option 30 to send the message as opposed to an unsecure send message button 28 at step 114. The message can then be sent at step 116. Secure messages 18 or others can then be subjected to session rules at step 118 which can be the same or different session rules which can apply to reading secured messages at step 110 which can include timing out after a period of inactivity, timing out after a period of opening either the Messages service at step 100, or the other time period, placing the Messages in the background mode, locking the screen and/or other session rules. Once the session rule is met, then the secure messages are preferably masked with masks 20 and/or temporarily removed until the user enters the appropriate authorization provided by the particular embodiment which could include one of a variety of possibilities, whether it be a PIN or other authorization.

Remember this messaging tool may provide not only the ability to send encrypted messages within a less secure messaging protocol but also (and/or) provide an ability to store messages in an encrypted mode on each of the devices and the applicants server (remote) so that they are not visible without entering at least the authorization code as well as the ability to provide access controls so that a third party which lacks the authorization controls cannot access secure information merely by opening the less secure messaging application on a device of an individual such as if a third party picks up a smart phone and opens the Messages application, possibly while simultaneously permitting unsecured communications to proceed through the same application.

To the applicant knowledge, no party has the ability to provide this service.

For many embodiments, this tool is specifically differentiated from possible existing messaging systems designed to provide secure communication because the applicants technology is designed to be utilized within the framework of a less secure communication protocol which are presently widely accepted across the communications industry to the point of having somewhere over two billion users as it relates to Facebook Messenger and Apple Messages combined. These users are not likely to quickly switch messaging apps. Instead, the applicant has developed a way to use those less secure messaging applications in a more secure manner. In many embodiments, both secure and non-secure communications can occur within the same platform, for which the applicant is unaware of any party performing such a capability.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the intention are intended to be included within the scope of the appended claims.

Having thus set forth the nature of the invention, what is claimed herein is:

The invention claimed is:

1. A method of secure communication between a first party and a second party configured to exchange secure messages within a less secure messaging system, the less secure messaging system configured to exchange unsecured messages, wherein a secure communication tool is configured to cooperate with the less secure messaging system to enable communication of the secure messages over the less secure messaging system, the method comprising:
   sending one or more unsecure messages from an electronic device of the second party to an electronic device of the first party;
   creating, at the electronic device of the second party, a secure message containing at least one portion that is masked to be unreadable on the electronic device of the first party in accordance with the secure communication tool, wherein the at least one masked portion of the secure message is configured so it cannot be displayed as a readable message by the electronic device of the first party until after the first party has provided an authorization associated with the secure communication tool; and
   sending the secure message containing the at least one masked portion from the electronic device of the second party to the electronic device of the first party.

2. The method of claim 1 wherein the at least one masked portion of the secure message is configured so it is not visible on the electronic device of the first party until after the first party has provided the authorization associated with the secure communication tool.

3. The method of claim 1 wherein the at least one masked portion of the secure message comprises at least one encrypted portion.

4. The method of claim 1 where in the at least one masked portion of the secure message is configured to be visible on a screen of the electronic device of the first party but not readable by the first party before the authorization is provided by the first party.

5. The method of claim 4 wherein the at least one masked portion of the secure message has an overlay preventing the first party from reading the at least one masked portion of the secure message until after the authorization is provided by the first party and the overlay removed.

6. The method of claim 1 wherein the at least one masked portion of the secure message is configured to be displayed on a screen of the electronic device of the first party using a different background color than the one or more unsecure messages.

7. The method of claim 1 wherein the authorization is one of a PIN number or a password.

8. The method of claim 1 wherein the at least one masked portion of the secure message is stored on a server that is remote from both the electronic device of the first party and the electronic device of the second party.

9. The method of claim 1 further comprising a step of sending the secure message containing the at least one masked portion to a server that is remote from both the electronic device of the first party and the electronic device of the second party.

10. The method of claim 1 wherein the secure communication tool is configured to cause the at least one masked portion of the secure message to be in an unreadable configuration at the electronic device of the first party if at least one rule is satisfied.

11. The method of claim 10 wherein the at least one rule is selected from the group of the first party's electronic device logging out, the first party's electronic device placing a messaging program in a background mode, a set period of time elapsing after the first party's electronic device receives the authorization from the first party, a set period of time elapsing after a last key entry at the first party's electronic device, the first party's electronic device turning off a screen, or the first party's electronic device ending the messaging program.

12. The method of claim 1 wherein the less secure messaging system comprises one of Facebook Messenger or Apple Messages.

13. An electronic device of a second party configured to communicate secure messages to an electronic device of a first party within a less secure messaging system, the less secure messaging system configured to exchange unsecured messages, the electronic device of the second party comprising:

a secure communication tool comprising an application configured for use with the less secure messaging system, the secure communication tool configured to cooperate with the less secure messaging system to enable communication of the secure messages over the less secure messaging system, wherein the secure communication tool is configured to create a secure message containing at least one portion that is masked to be unreadable on the electronic device of the first party until after the first party has provided an authorization to enable the at least one masked portion to be displayed as a readable message on the electronic device of the first party; and a messaging program configured to send one or more unsecure messages from the electronic device of the second party to the electronic device of the first party, the messaging program being further configured to cooperate with the secure communication tool to send the secure message containing the at least one masked portion to the electronic device of the first party.

14. The electronic device of claim 13 wherein the secure communication tool on the electronic device of the second party is configured to create the secure message so it can be processed by a corresponding secure communication tool on the electronic device of the first party.

15. A non-transitory computer-readable storage medium comprising software instructions for execution on an electronic device of a first party to implement a secure communication tool, wherein the secure communication tool is configured to cooperate with a less secure messaging system to enable communication of secure messages from a second party to the first party over the less secure messaging system, wherein the secure communication tool, when executed on the electronic device, causes the electronic device to perform the steps of:

causing a secure message, which was sent from the second party and received at the electronic device of the first party, to be unreadable on the electronic device of the first party, the secure message containing at least one portion that was masked to be unreadable on the electronic device of the first party in accordance with the secure communication tool, wherein the secure message includes the at least one masked portion at the time that the secure message is received at the electronic device of the first party;

providing a user interface on the electronic device of the first party to enable the first party to enter an authorization to view the at least one masked portion of the received secure message as a readable message displayed on a screen of the electronic device;

receiving the authorization from the first party to view the at least one masked portion of the received secure message as a readable message displayed on the screen of the electronic device; and displaying, after receiving the authorization from the first party, the at least one masked portion of the secure message as a readable message on the screen of the electronic device of the first party.

16. The non-transitory computer-readable storage medium of claim 15 wherein the secure communication tool is further configured to cause the electronic device of the first party to return the readable message corresponding to the at least one masked portion of the secure message back to an unreadable configuration if at least one rule is satisfied.

17. The non-transitory computer-readable storage medium of claim 16 and wherein the at least one rule is selected from the group of logging out, placing a messaging program in a background mode, a set period of time elapsing after receiving the authorization, a set period of time elapsing after a last key entry, turning off the screen, or ending the messaging program.

18. The non-transitory computer-readable storage medium of claim 15 wherein the authorization is one of a PIN number or a password.

19. The non-transitory computer-readable medium of claim 15 wherein the at least one masked portion of the secure message comprises at least one encrypted portion when the secure message is received at the electronic device of the first party.

20. The non-transitory computer-readable of claim 15 wherein the less secure messaging system comprises one of Facebook Messenger or Apple Messages.

* * * * *

UNITED STATES PATENT AND TRADEMARK OFFICE
CERTIFICATE OF CORRECTION

| | |
|---|---|
| PATENT NO. | : 11,799,654 B2 |
| APPLICATION NO. | : 17/230324 |
| DATED | : October 24, 2023 |
| INVENTOR(S) | : Bo Ferger and Rob Whelan |

It is certified that error appears in the above-identified patent and that said Letters Patent is hereby corrected as shown below:

In the Claims

Claim 4, Column 6, Line 60: "The method of claim 1 where in the at least one masked" should read --The method of claim 1 wherein the at least one masked--

Claim 19, Column 8, Line 55: "The non-transitory computer-readable medium of" should read --The non-transitory computer-readable storage medium of--

Claim 20, Column 8, Line 60, "The non-transitory computer-readable of claim 15" should read --The non-transitory computer-readable storage medium of claim 15--

Signed and Sealed this
Twenty-fifth Day of June, 2024

*Katherine Kelly Vidal*

Katherine Kelly Vidal
*Director of the United States Patent and Trademark Office*